INVENTOR.
RALPH MANSFIELD
BY
Richard C. Lindberg
ATTORNEY

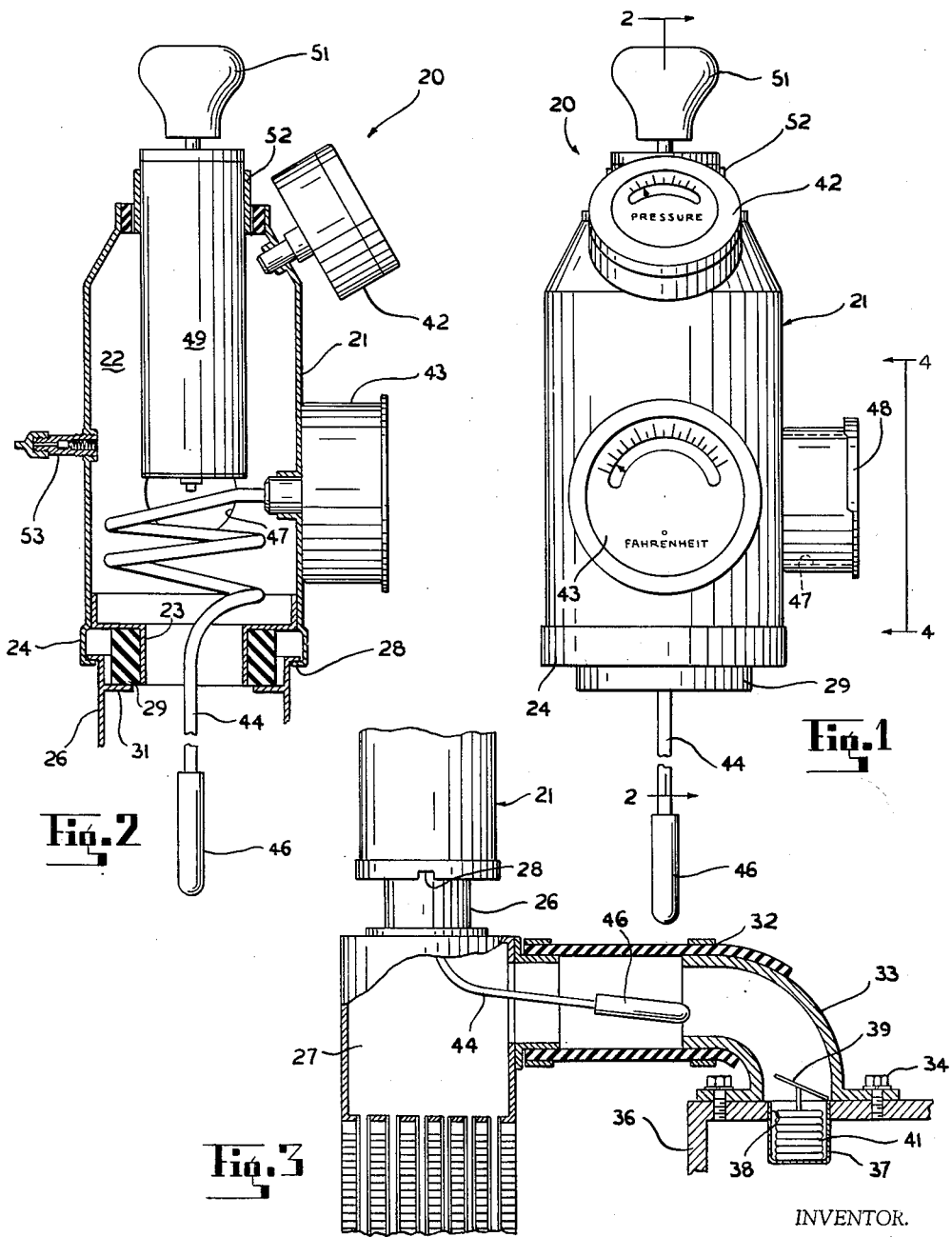
Aug. 13, 1963     R. MANSFIELD     3,100,391
AUTOMOTIVE COOLING SYSTEM TESTER
Filed Dec. 26, 1957     2 Sheets-Sheet 1
INVENTOR.
RALPH MANSFIELD
BY Richard C. Lindberg
ATTORNEY Aug. 13, 1963   R. MANSFIELD   3,100,391
AUTOMOTIVE COOLING SYSTEM TESTER
Filed Dec. 26, 1957   2 Sheets-Sheet 2

United States Patent Office 3,100,391
Patented Aug. 13, 1963

3,100,391
AUTOMOTIVE COOLING SYSTEM TESTER
Ralph Mansfield, Chicago, Ill., assignor to Auto-Test, Incorporated, Chicago, Ill., a corporation of Illinois
Filed Dec. 26, 1957, Ser. No. 705,436
9 Claims. (Cl. 73—40)

This invention relates generally to test equipment for internal combustion engines and particularly to improvements in test equipment for the cooling system of such engines.

In comparatively recent years manufacturers of liquid cooled engines have pressurized the cooling systems by the use of a pressure cap on the radiator opening. This pressurizing of the cooling system permits higher temperatures of the coolant with attendant higher efficiency of engine performance.

In order to prevent the circulation of coolant a thermostat is provided which opens only when the temperature of the coolant in the engine jacket has reached a proper operating temperature. Ordinarily the thermostat is adjusted to open at as high a temperature as possible, without causing boiling of the coolant, and in the case where water is used as the cooling liquid it is desirable that the thermostat open at a point as close to the boiling point of the coolant liquid as is feasible. Obviously if the aforementioned pressure cap does not maintain the proper pressure on the cooling system, the coolant may boil at too low a temperature. Also, if the thermostat opens at too low a temperature, the coolant will be circulated at a temperature not giving the best engine performance.

The aforementioned considerations are especially important where the engines are operated at high altitudes where the boiling point of water is considerably below 212° F., or where the coolant has a low boiling point additive to prevent freezing, such as methanol. By properly pressurizing the system, high temperatures of the coolant may be achieved and without boiling off volatile anti-freeze additives.

With the foregoing considerations in mind it is a principal object of this invention to test both the pressure cap and the thermostat to determine whether they are functioning properly.

Another object is to provide a cooling system tester which can be operated under dynamic conditions or under static conditions if desired.

Yet another object is to provide a tester for the cooling system of an automotive engine, which tester is adaptable for use in testing of both passenger car and heavy duty truck engines.

Other objects and important features of the invention will be apparent from a study of the specification following taken with the drawings which together describe and illustrate a preferred embodiment of the invention, and what is now considered to be the best mode of practicing the principles thereof.

Other embodiments may be suggested to those having the benefit of the teachings herein and such other embodiments are intended to be reserved especially as they fall within the scope and spirit of the subjoined claims.

In the drawings:

FIG. 1 is an elevational view of a cooling system tester embodying the principles of the present invention:

FIG. 2 is a vertical sectional view thereof taken along the line 2—2 of FIG. 1 and looking in the direction of the arrows;

FIG. 3 is an elevational view showing the manner in which the tester can be placed in position of the radiator filler neck of an automotive engine;

Figure 6:
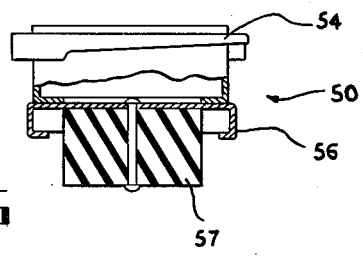
FIG. 6 is an elevational view, certain parts being shown in section, of a double purpose sealer cap adapted to be used with the apparatus seen in FIGS. 1 to 5 inclusive.

Referring now particularly to FIGS. 1 and 2 of the drawings, the improved cooling system tester according to the present invention is designated generally by the reference numeral 20 and includes a housing 21 defining a chamber 22. The chamber 22 has a lower opening 23 having means 24 thereat for securing the housing 21 to the filler neck 26, see also FIG. 3 of a radiator 27.

The means 24 for securing the housing 21 to the filler neck 26 is of the bayonet lock type 28, the bayonet locking members 28 cooperating with an inclined camming surface, not shown, on the filler neck 26, so that a flexible sealing ring 29 is in firm engagement with a seat 31 inside the filler neck 26.

As seen in FIG. 3, the radiator 27 is connected by an upper radiator hose 32 to a goose-neck 33 held by cap screws 34 to an engine block 36. A thermostat 37 is seated across an opening 38 in an engine block 36 and includes a valve 39 actuated by a thermostat element 41, which may be of the bellows type as shown.

Referring back to FIGS. 1 and 2 of the drawings, the housing 21 affords a support for a pressure gauge 42 communicating with the chamber 22 so as to measure the pressure therein. The housing 21 also affords a support for a temperature gauge 43 connected to a length of capillary tube 44 having a vapor tension bulb 46 at the other end thereof.

The housing 21 also has an opening 47 therefrom including means 48 for securing the usual radiator cap thereat. The radiator cap, not shown, is of the type having a bayonet lock similar to the bayonet lock 28 of the means 24 for securing the housing 21 to the radiator filler neck.

The housing 21 also includes means in the form of a pump 49 having an operating handle 51. The pump 49 is held in the ferrule 52 extending from the upper end of the housing 21, the pump 49 being welded or brazed thereto.

In lieu of the pump 49 for pressurizing the chamber 22 a conventional valve stem 53 can be provided for connection to a supply of air under pressure to pressurize the chamber 22.

Figure 7:
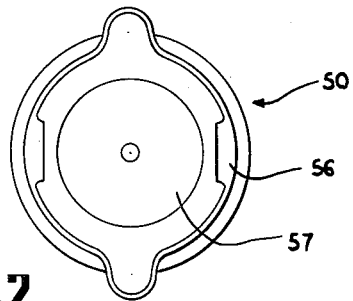
FIG. 7 is a bottom view of the double purpose sealer cap seen in FIG. 6.
Figure 9:
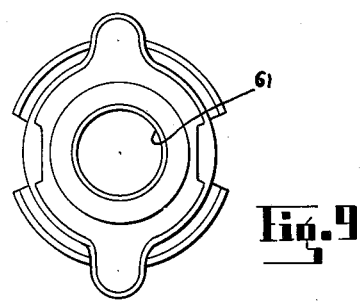
FIG. 9 is a bottom view of the adapter seen in FIG. 8.
Figure 5:
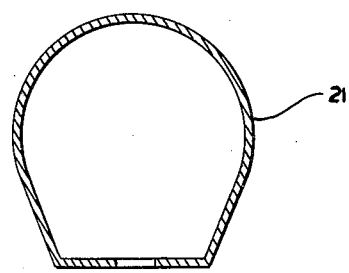
FIG. 5 is a section taken along the line 5—5 of FIG. 4 looking in the direction of the arrows.
Figure 10:
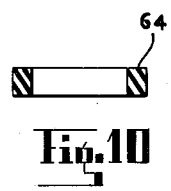
FIG. 10 is a cross-sectional view of a spacer ring for use with the adapter of FIG. 8, so that it can be used with a filler neck of long length.
Figure 11:
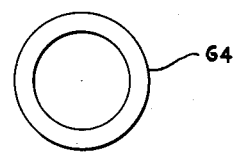
FIG. 11 is a plan view of the spacer ring seen in FIG. 10.
Figure 4:
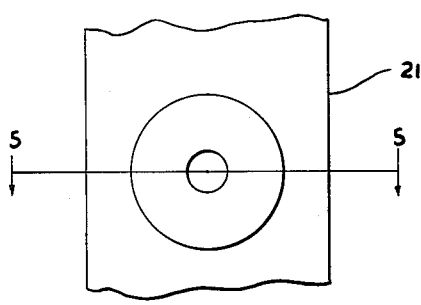
FIG. 4 is a partial elevational view looking in the direction of the arrows 4—4 of FIG. 1.

The apparatus thus far described can be employed for the static testing of the radiator filler cap. Under such conditions the housing 21 is not mounted to the radiator filler neck 26, seen in FIGS. 2 and 3, but the radiator filler cap, not shown, is secured to the means 48 at the side of the housing 21. As seen in FIGS. 6 and 7, a dual purpose sealer cap indicated generally by the reference numeral 50 has a neck portion 54 similar to the filler neck 26 seen in FIG. 2. The dual purpose sealer cap has also locking means 56 corresponding to the locking means 24 and 28 seen in FIG. 2, together with a rubber sealing member 57. However, the dual purpose sealer cap 50 is arranged to seal the opening 23 when in position thereon, and the conventional radiator cap, not shown, is arranged to seal the opening 47 when secured in position at the means 48 seen in FIG. 1.

Pressure can now be applied to the chamber 22 and against the usual filler cap, the pressure within the chamber 22 being raised to the value prescribed for the unit by the manufacturer. If the pressure within the chamber 22 obtains over an extended period of time the operator learns that the filler cap is functioning properly.

It may be noted that the capillary tube 44 is sufficiently flexible so as to be pushed upward together with its vapor bulb 46 within the chamber 22, so that the dual purpose sealer cap can be placed in position at the means 24.

The dual purpose sealer cap 50 is also arranged for use with the test unit seen in FIGS. 1 to 3 inclusive, to test the cooling system seen in FIG. 3 for leaks. During such testing the dual purpose sealer is secured at its locking means 56 to the means 48 to seal the opening 47 of the chamber 22. During such time the housing 21 is placed in position on the filler neck 26 as seen in FIG. 2, and the entire system is pressurized by the pump 51 or by means of a source of air under pressure connected at the valve stem 53. If the pressure reading on the gauge 42 obtains over an extended period the operator learns that the system is tight, at least under static conditions.

Ordinarily testing of the thermostat 37 can only be achieved by removing same from the engine. The test is made by immersing the thermostat in a pot of water containing a thermometer, a thread being inserted across the valve 39 of the thermostat and tied to a hook to suspend the thermostat in the water. The temperature of the water is then increased and the thermostatic valve opens and falls from the thread, at which time the observer makes a reading of the temperature.

The apparatus according to the present invention is arranged for testing of the thermostat 37 under dynamic conditions. The operator may, if desired, thread the vapor tension bulb 46 and its capillary tube 44 into the radiator hose 32 to a position close to the thermostat 37. However, it has been found that there is substantially no temperature gradient between the point on the engine where the thermostat 37 is located and the radiator 27, and the operator may instead wish to place the vapor tension bulb 46 in position at the radiator. The dual purpose sealer cap 50 is placed in position on the housing 21 as for the operation described in testing the system against leakage under static conditions. As the coolant temperature increases from the engine heat, thermostat 37 will open at some predetermined temperature to permit the coolant to pass into and circulate through the radiator 27. At the instant the thermostat 37 opens, the temperature gauge 43 will exhibit a marked increase in reading rising abruptly to the thermostat setting.

The pressure will build up in the system during this same period to indicate a fixed value in pressure on the pressure gauge 42. It will be seen therefore that the dynamic operating conditions of the cooling system can be determined just as they actually exist, rather than under the static conditions previously outlined and without the added labor of removing and reinstalling the thermostat.

The apparatus according to the present invention is arranged for the conjoint testing of both the thermostat and the pressure cap under dynamic conditions. During such testing the apparatus is mounted on the filler neck 26, as seen in FIG. 3, and the radiator filler cap specified for the vehicle is placed in position at the means 48 at the side of the housing 21. Since the pressure and temperature vary in a direct relationship for a fixed volume the characteristics of both the radiator filler cap and the thermostat can be determined in a single test.

Consider the test being made on a vehicle, the engine temperature of which is at the ambient. When the cold engine is started the following happens:

As the temperature of the cooling liquid increases, the pressure within the tester will rise, since there is a fixed volume at all times. As the engine continues to warm up and its coolant temperature increases, the temperature will rise to a certain value as determined by the release pressure of the cap being tested. The temperature can rise no higher, provided the thermostat is set to open at a lower temperature. If the radiator filler cap releases pressure at too low a value, the temperature of the coolant will never rise beyond a value corresponding to the boiling point for such pressure. This is the main purpose of a pressurized system, to bring the temperature of the coolant up to a desirably high value resulting from the pressurizing of the system.

If the thermostat opens at a higher than proper temperature setting, there will be a back pressure against the thermostat caused by the increase in temperature of the coolant behind the thermostat, the entire system being a closed one. This back pressure will be reflected through the coolant circulating pump, if there be one, and up to the filler neck of the radiator. The tester will then indicate the pressure which is high in value, although the then temperature of the coolant at the radiator filler neck will be low by reason of the fact that the thermostat has not opened. This will give an indication that the thermostat is not opening at its proper temperature, and is opening at too high a temperature, or not at all.

In the event the thermostat opens at too low a temperature, the tester will show the pressure obtaining in the system as it increases during the engine warm up period. When the temperature gauge shows a sudden upward change, the thermostat has opened, and if this temperature is less than for which it was originally set, then the operator knows that it is not functioning properly. It will be obvious that the pressure within the system will be limited only by the pressure setting of the radiator filler cap secured to the opening on the tester housing.

If the pressure continues to rise, and reaches a value above the proper setting of the filler cap, then the operator knows that both the thermostat and the cap may be defective.

After the opening of the thermostat, if the gauge pressure never reaches its correct value, then the operator knows that the filler cap relieves the pressure at too low a value. As the engine continues to warm up and the pressure within the system rises to a value higher than the proper relief value for the filler cap being tested, then the operator knows that such cap is faulty.

Obviously, if the pressure reading does not remain steady, either the cap or the system leaks at the observed temperature. Substitution of a new cap on the assembly may correct the pressure drop. This would indicate that a new pressure cap is the desired remedy. If such is not the case then the system has a leak within it. Further testing can be done as before by permitting the engine to cool off and using the pump 49 to pressurize the assembly or by fitting a pressure hose to the valve stem 53, the operator then being able to detect the loss of water at the leak.

Referring now to FIGS. 8 to 11 of the drawings, the apparatus is arranged to be used with the smaller type of filler neck such as is found on certain type of passenger automobiles and also with long filler necks as may be found from time to time.

Figure 8:
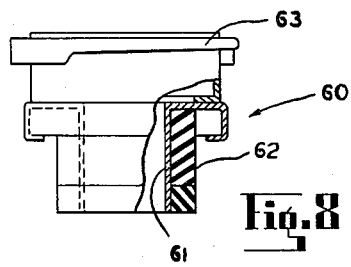
FIG. 8 is an elevational view, certain parts thereof being shown in section, of an adapter for the test unit seen in FIGS. 1 to 5, inclusive, whereby such test unit can be used with radiator filler necks of different sizes.

Referring now to FIG. 8, there is shown an adapter 60 with a long neck portion 61 surrounded by a rubber sealing ring 62. The other end of the adapter 60 has locking means thereon 63 similar to that seen at 48 in FIG. 1. In cases where a very long filler neck is encountered the long neck portion 61 may be fitted with an auxiliary sealer ring 64. The adapter 60 may then have the test apparatus 20 secured at its locking means 63 as previously described in connection with the filler neck 26 of FIG. 2.

It will thus be seen that the test apparatus previously described can be employed for both static and dynamic testing of the cooling system of an internal combustion engine. The apparatus according to the present invention makes it unnecessary to remove the thermostat for testing thereof. Furthermore, the apparatus is capable of testing the system for leaks both while the engine is cold and while it is warm. Also, the apparatus may be used for testing the condition of the pressure cap both under the static and dynamic condition.

While the invention has been described in terms of a preferred embodiment thereof its scope is intended to be limited only by the claims here appended.

I claim as my invention:

1. In a cooling system tester for an internal combustion engine employing liquid coolant and having a radiator and a thermostat, a housing having a chamber therein, said chamber having an opening therefrom, said housing including means at said opening for securing said housing to the filler neck of the radiator of said engine, said chamber having a second opening therefrom, said housing including means at said second opening for securing the usual radiator cap for said radiator at said second opening, a closure adapted to close the first or the second of said openings as desired, means operatively connected with said chamber for measuring the pressure in said chamber, means operatively connected with said chamber for measuring the temperature of the coolant as determined by the setting of said thermostat, and means operatively connected with said chamber for pressurizing said chamber and said coolant, said closure being adapted to close either of said openings for the static testing of said radiator cap when said radiator cap is secured at the other of said openings, said closure being adapted to close said second opening when the tester is secured to said filler neck, for measuring the dynamic pressure and temperature conditions of said radiator alone, the radiator cap being adapted to be secured to said second opening when the static and dynamic conditions of said radiator cap and said radiator are being tested, and said housing is secured to said filler neck at its said first opening.

2. In a cooling system tester for an internal combustion engine employing liquid coolant and having a radiator and a thermostat, a housing having a chamber therein, said chamber having an opening therefrom, said housing including means at said opening for securing said housing to the filler neck of the radiator of said engine, a second opening therefrom, said housing including means at said second opening for securing the usual radiator cap for said radiator at said second opening, a closure adapted to close the first or the second of said openings as desired, means operatively connected to said chamber for measuring the pressure therein, means operatively connected to said chamber for measuring the temperature of the coolant as determined by the setting of said thermostat, and a pump supported on said housing for pressurizing said chamber and said coolant, said closure being adapted to close either of said openings for the static testing of said radiator cap when said radiator cap is secured at the other of said openings, said closure being adapted to close said second opening when the tester is secured to said filler neck, for measuring the dynamic pressure and temperature conditions of said radiator alone, the radiator cap being adapted to be secured to said second opening when the static and dynamic conditions of said radiator cap and said radiator are being tested, and said housing is secured to said filler neck at its said first opening.

3. In a cooling system tester for an internal combustion engine employing liquid coolant and having a radiator and a thermostat, a housing having a chamber therein, said chamber having an opening therefrom, said housing including means at said opening for securing said housing to the filler neck of the radiator of said engine, a second opening therefrom, said housing including means at said second opening for securing the usual radiator cap for said radiator at said second opening, a closure adapted to close the first or the second of said openings as desired, means operatively connected to said chamber for measuring the pressure therein, means supported on said housing for measuring the temperature of the coolant as determined by the setting of said thermostat, including a vapor bulb extending into said coolant and a gauge connected thereto, and means communicating with said chamber for pressurizing said chamber and said coolant, said closure being adapted to close either of said openings for the static testing of said radiator cap when said radiator cap is secured at the other of said openings, said closure being adapted to close said second opening when the tester is secured to said filler neck, for measuring the dynamic pressure and temperature conditions of said radiator alone, the radiator cap being adapted to be secured to said second opening when the static and dynamic conditions of said radiator cap and said radiator are being tested, and said housing is secured to said filler neck at its said first opening.

4. In a cooling system tester for an internal combustion engine employing liquid coolant and having a radiator and a thermostat, a housing having a chamber therein, said chamber having an opening therefrom, said housing including means at said opening for securing said housing to the filler neck of the radiator of said engine, a second opening therefrom, said housing including means at said second opening for securing the usual radiator cap for said radiator at said second opening, a closure adapted to close the first or the second of said openings as desired, means operatively connected to said chamber for measuring the pressure therein, and means supported on said housing for measuring the temperature of the coolant as determined by the setting of said thermostat, said closure being adapted to close either of said openings for the static testing of said radiator cap when said radiator cap is secured at the other of said openings, said closure being adapted to close said second opening when the tester is secured to said filler neck, for measuring the dynamic pressure and temperature conditions of said radiator alone, the radiator cap being adapted to be secured to said second opening when the static and dynamic conditions of said radiator cap and said radiator are being tested, and said housing is secured to said filler neck at its said first opening.

5. In a cooling system tester for an internal combustion engine employing liquid coolant and having a radiator and a thermostat for controlling the temperature of said coolant, a housing having a chamber therein, said chamber having an opening therefrom, said housing including means at said opening for securing said housing to the filler neck of said radiator, a second opening therefrom, said housing including means at said second opening for securing the usual radiator cap for said radiator at said second opening, a closure adapted to close the first or second of said openings as desired, means connected to said chamber for measuring the pressure therein and including an indicator of pressure, and means connected to said chamber for pressurizing said chamber, said closure being adapted to close one of said openings for the static testing of said radiator cap when said radiator cap is secured at the other of said openings, said closure being adapted to close said second opening when the tester is secured to said filler neck for measuring the dynamic pressure condition of said radiator alone, the radiator cap being adapted to be secured to said second opening when the static and dynamic conditions of said radiator cap and said radiator are being tested, and said housing is secured to said filler neck at its said first opening.

6. A cooling system tester for an internal combustion engine employing liquid coolant and having a radiator and a thermostat, said cooling system tester comprising means for measuring the temperature and pressure within said system, said tester having an opening therein including means at said opening for securing said tester to the filler neck of the radiator of said engine with said temperature and pressure measuring means in a position to respond to the pressure and temperature of said coolant, said tester having a second opening therein, said tester including means at said second opening for securing the usual radiator cap for said radiator to said second opening and subjecting said cap to the pressure within said cooling system, said radiator cap being adapted to be secured at said second opening when the static and dynamic conditions of said radiator cap, said radiator and said thermostat are being tested, and said first named securing means is secured to said filler neck.

7. In a cooling system tester for an internal combustion engine employing liquid coolant and having a radiator and a thermostat, a housing having a chamber therein, said chamber having an opening therefrom, said housing including means at said opening for securing said housing to the filler neck of the radiator of said engine, a second opening therefrom, said housing including means at said second opening for securing the usual radiator cap for said radiator at said second opening, means supported by said housing for measuring the temperature of the coolant of said system at a point in proximity to said filler neck, and means operatively connected to said chamber for measuring the pressure within said chamber and said cooling system, said radiator cap being adapted to be secured to said second opening when the dynamic conditions of said radiator cap, radiator and said thermostat are being tested, and said housing is secured to said filler neck at its said first opening.

8. In a cooling system tester for an internal combustion engine employing liquid coolant and having a radiator and thermostat, a housing having a chamber therein, said chamber having an opening therefrom, said housing including means at said opening for securing said housing to the filler neck of the radiator of said engine, a second opening therefrom, said housing including means at said second opening for securing the usual radiator cap for said radiator at said second opening, means operatively connected to said chamber for measuring the pressure within said chamber and said cooling system, means supported on said housing for measuring the temperature of the coolant of said system at said filler neck, and a pump operatively connected to said chamber for pressurizing said chamber and said cooling system, said radiator cap being adapted to be secured to said second opening when the dynamic conditions of said radiator cap, said radiator, and said thermostat are being tested and said housing is secured to said filler neck at its said first opening.

9. In a cooling system tester for an internal combustion engine employing liquid coolant and having a radiator and a thermostat, a housing having a chamber therein, said chamber having an opening therefrom, said housing including means at said opening for securing said housing to the filler neck of the radiator of said engine, a second opening therefrom, said housing including means at said second opening for securing the usual radiator cap for said radiator at said second opening, means operatively connected to said chamber for measuring the pressure within said chamber and said cooling system, and means operatively connected to said chamber for measuring the temperature of the coolant at said filler neck including a vapor bulb extending in the coolant at said filler neck, said radiator cap being adapted to be secured to said second opening when the dynamic condition of said radiator cap, said radiator, and said thermostat are being tested and said housing is secured to said filler neck at its said first opening.

References Cited in the file of this patent

UNITED STATES PATENTS

| | | |
|---|---|---|
| 1,518,896 | Boyce | Dec. 9, 1924 |
| 1,824,372 | Schlaich | Sept. 22, 1931 |
| 2,847,851 | Enell | Aug. 19, 1958 |